United States Patent
Sollenberger et al.

(10) Patent No.: US 7,953,385 B2
(45) Date of Patent: May 31, 2011

(54) SYSTEM AND METHOD TO MANAGE PROCESSING OPERATIONS WITHIN A WIRELESS TERMINAL FOLLOWING RECEIPT OF A NULL PAGE

(75) Inventors: Nelson R. Sollenberger, Farmingdale, NJ (US); Ronish Patel, East Windsor, NJ (US); Kenneth L. Kasiske, Jackson, NJ (US); Karl Paulsen, Park City, UT (US); Zhijun (Nick) Gong, Iselin, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/631,919

(22) Filed: Dec. 7, 2009

(65) Prior Publication Data

US 2010/0087153 A1 Apr. 8, 2010

Related U.S. Application Data

(63) Continuation of application No. 10/967,603, filed on Oct. 18, 2004, now Pat. No. 7,630,701.

(51) Int. Cl.
*H04B 1/16* (2006.01)

(52) U.S. Cl. .......... 455/343.3; 455/127.5; 455/574; 455/343.1; 455/343.2; 455/343.4; 455/423; 455/437; 455/442; 455/456.2; 455/67.11; 455/68; 370/311; 370/318

(58) Field of Classification Search ............. 455/127.5, 455/343.1–343.4, 522, 574, 422.1, 423–425, 455/436–444, 456.1–456.6, 458, 67.11, 68; 370/311, 318

See application file for complete search history.

(56) References Cited

U.S. PATENT DOCUMENTS

| 5,930,706 A * | 7/1999 | Raith .................. 455/422.1 |
| 6,289,227 B1 * | 9/2001 | Shi ........................ 455/574 |
| 6,765,893 B1 * | 7/2004 | Bayley ................... 370/335 |
| 2003/0114132 A1 * | 6/2003 | Yue ........................ 455/343 |
| 2004/0043798 A1 * | 3/2004 | Amerga et al. ........... 455/574 |

* cited by examiner

*Primary Examiner* — Edward Urban
*Assistant Examiner* — Junpeng Chen
(74) *Attorney, Agent, or Firm* — Garlick Harrison & Markison; Shayne X. Short (57) ABSTRACT

A method and system to determine when a wireless terminal has been paged by a servicing base station. An encoded paging burst is received on a paging channel and then decoded to produce a decoded paging burst. The decoded paging burst is processed to determine if it is a null page. When the encoded paging burst is a null page, subsequent processing operations scheduled to follow a later null page are rescheduled and immediately processed, allowing the wireless terminal to re-enter the sleep mode more quickly following the receipt of a subsequent paging burst.

20 Claims, 6 Drawing Sheets

SYSTEM AND METHOD TO MANAGE PROCESSING OPERATIONS WITHIN A WIRELESS TERMINAL FOLLOWING RECEIPT OF A NULL PAGE

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/967,603, entitled "System and method to manage processing operations within a wireless terminal following receipt of a null page," filed Oct. 18, 2004, pending, and scheduled to be issued as U.S. Pat. No. 7,630,701 on Dec. 8, 2009.

BACKGROUND OF THE INVENTION

1. Technical Field of the Invention

The present invention relates generally to cellular wireless communication systems; and more particularly to the managing processing operations performed following the receipt of a paging burst within a wireless terminal.

2. Description of Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. In GSM, wireless terminals are informed of the need to service incoming communications via pages from base stations to the wireless terminals. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

To conserve power, the wireless terminal may sleep when not actively communicating with a servicing base station. However, to ensure no communications are missed, the wireless terminal awakens periodically to receive a page burst that indicates if the wireless terminal must service a communication from the servicing base station processing operations are often scheduled to follow the receipt of a page. Since the operations are scheduled prior to the actual knowledge of the information contained within the page, these processing operations are often divided to be performed following multiple pages. To make this determination, the wireless terminal typically expends significant battery power and processing resources to decode the page burst to determine whether the wireless terminal was paged and perform scheduled processing operations. Thus, there exists a need for wireless terminals that can quickly and efficiently identify whether it has been paged and manage the performance of processing operations without unnecessarily consuming the resources of the wireless terminal.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
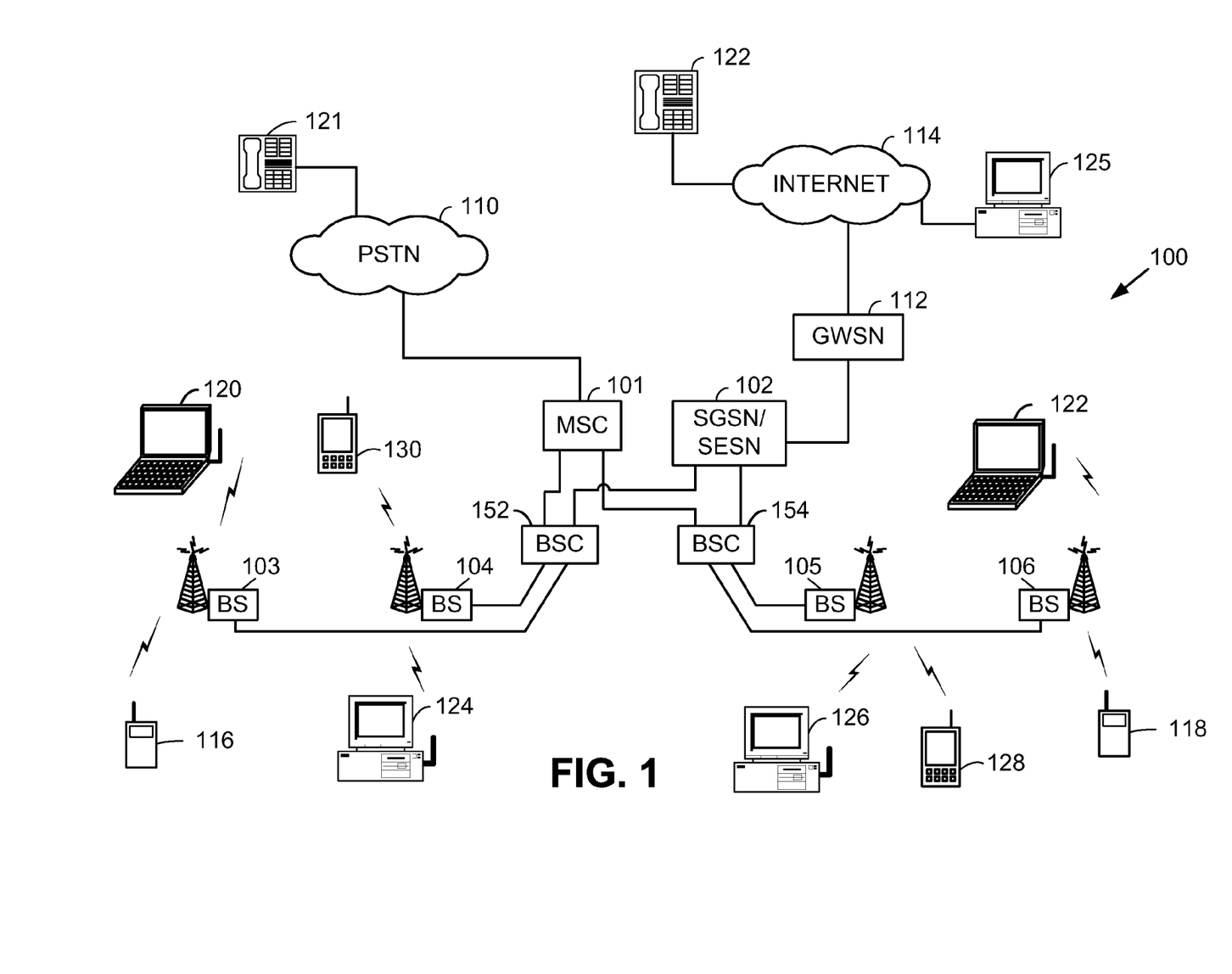
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that combine Automatic Repeat ReQuest (ARQ) operations at Layer 2, e.g., LINK/MAC layer with variable coding/decoding operations at Layer 1 (PHY).

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

Figure 2:
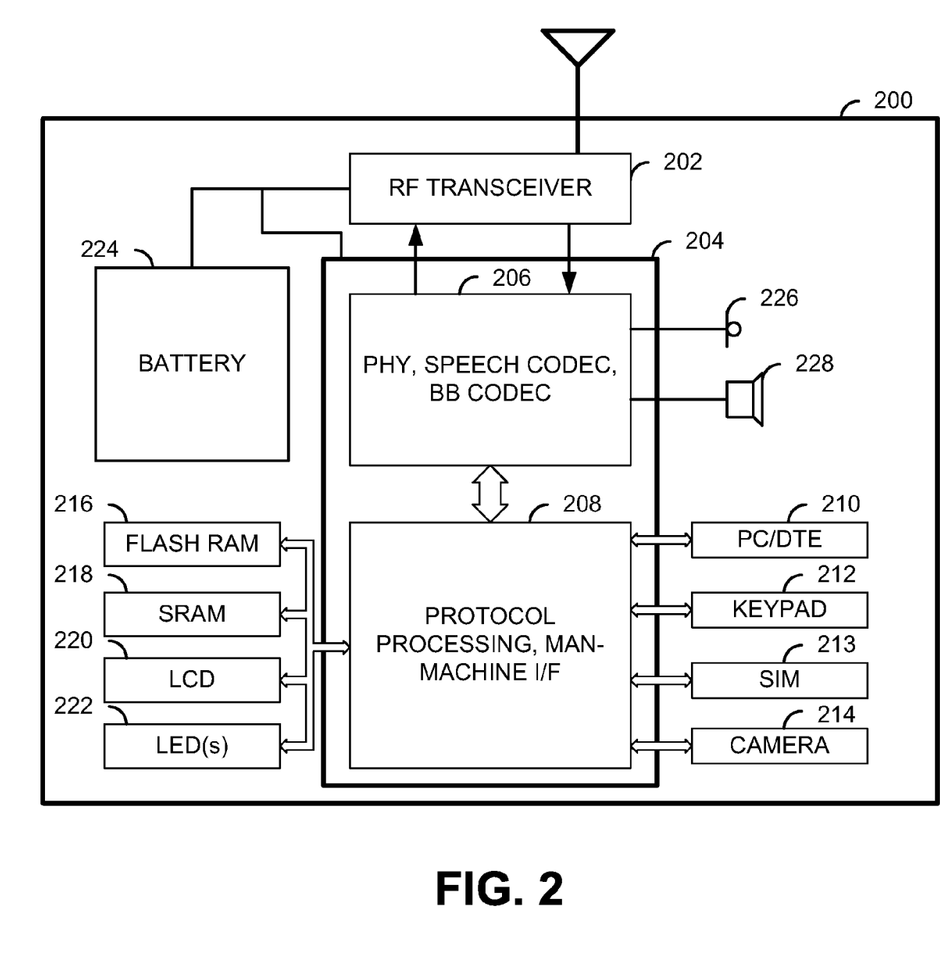
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
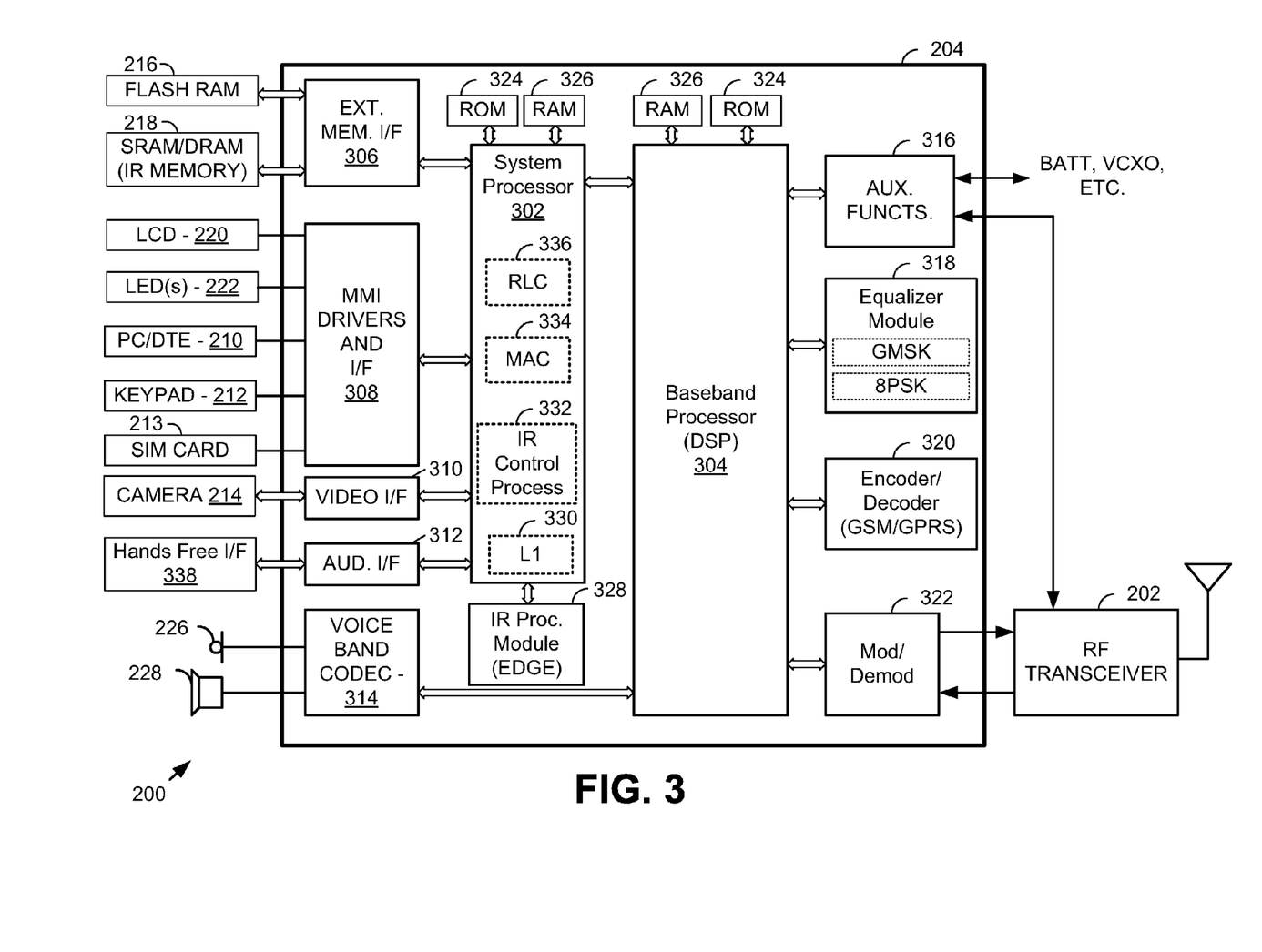
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an encoder/decoder module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204.

Figure 4A:
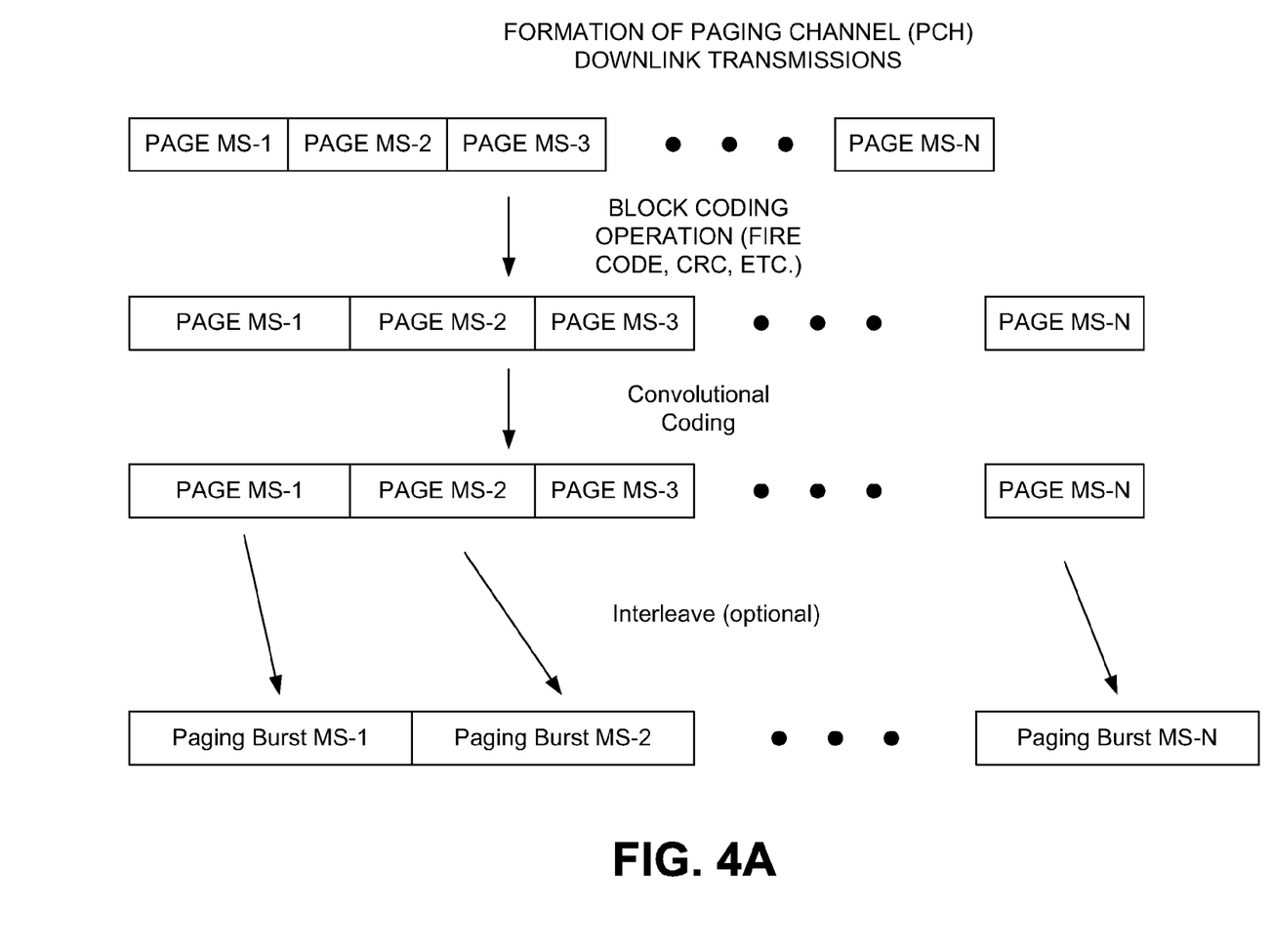
FIG. 4A is a block diagram illustrating the formation of paging channel downlink transmissions.

FIG. 4A depicts the various stages associated with forming and interpreting paging channel (PCH) downlink transmissions. The original pages for the individual wireless terminals or mobile stations are initially divided into a series of pages to be transmitted according to a predetermined schedule to the wireless terminals. This predetermined schedule allows the individual wireless terminals, when not actively transmitting, to enter a sleep mode and merely awaken when it is necessary to receive their respective page bursts. As shown here, the original page undergoes two stages of encoding. First, the original pages undergo a block coding operation that is typically referred to as outer encoding. The block coding stage, allows for the detection of errors within the data block. In addition, the Data blocks may be supplemented with tail bits or block code sequence. Since Block Coding is the first or external stage of channel coding, the block code is also known as an external or outer encoding scheme. Typically, two kinds of codes are used, a cyclic redundancy check (CRC) or a Fire Code. The Fire Codes allow for either error correction or error detection. Error detection with the Fire Code, verifies connectivity.

Next, the pages undergo a second level of encoding that typically is a convolutional coding referred to as inner encoding. The pages may be optionally interleaved to form paging bursts. These paging bursts are what the wireless terminal receives according to the predetermined schedule.

Figure 4B:
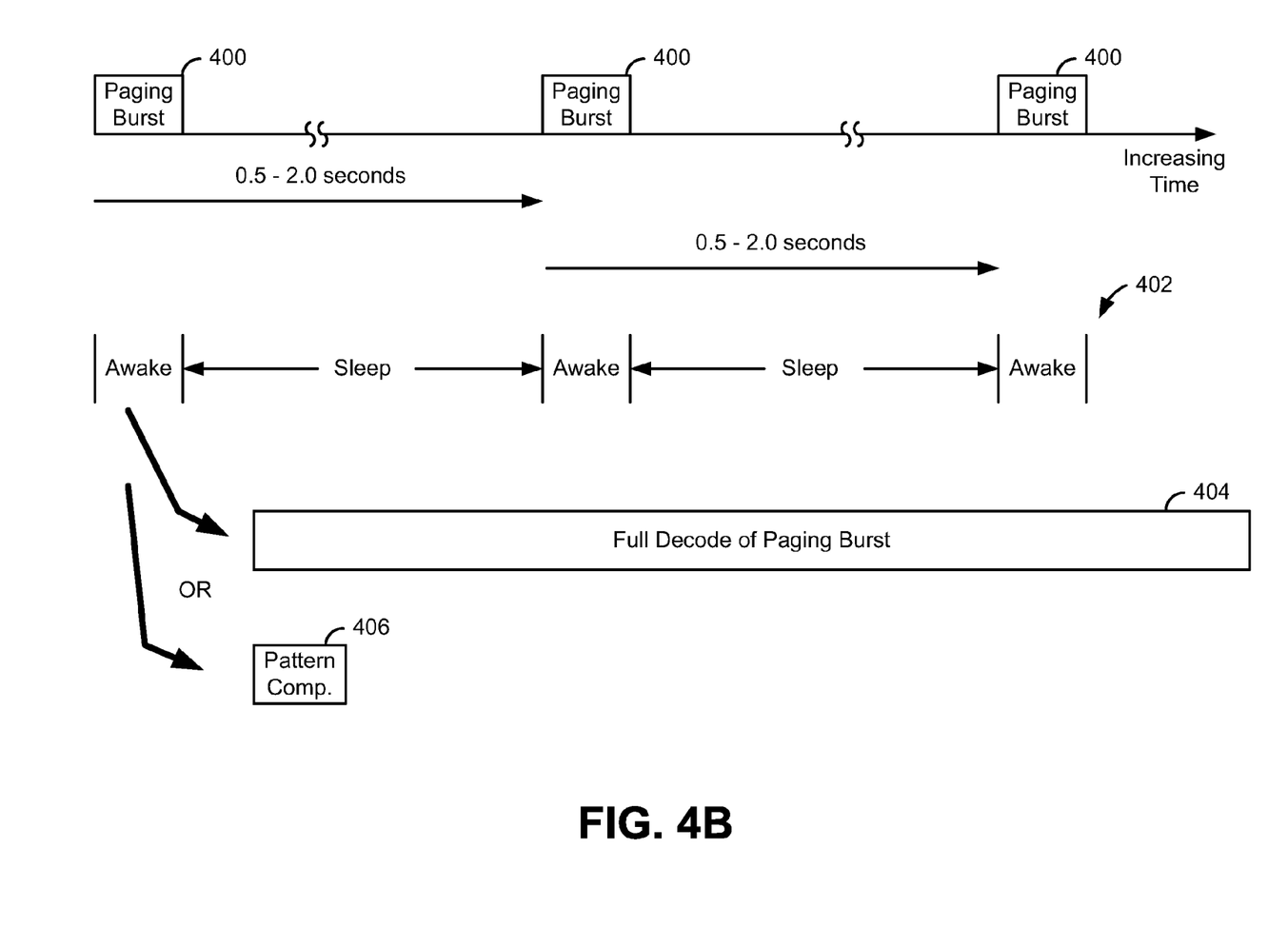
FIG. 4B is a timeline illustrating the awake period associated with the receipt and decoding of paging bursts, and the processing of operations following receipt of the paging burst.

FIG. 4B is a timeline illustrating the receipt and decoding of paging bursts particularly comparing full decoding to partial decoding according to the present invention. Illustrated in FIG. 4B are a series of paging bursts 400 that are received according to paging groups received approximately every 0.5 to 2.0 seconds. The paging bursts carry either a page or a null page for each wireless terminal assigned to a corresponding paging group. When carrying a page, the paging burst 400 signals the wireless terminal to respond to the servicing base station. This may involve servicing a voice call, data or text. When the paging burst 400 is sent, individual wireless terminals that are assigned to the paging group awaken for a period of time indicated by the awake portion of timeline 402 to receive the paging burst.

Typically, 4 paging bursts make up every paging message and traditionally all 4 paging bursts need to be received before decoding can begin. Housekeeping and processing operations often follow the processing of individual paging bursts. A sufficiently reliable indication of whether or not the paging message contains any useful information for the mobile may be obtained from only the 1st paging burst of the 4 paging bursts without waiting for the 4 paging bursts; as such, this would allow subsequent processing operations, awake periods and sleep periods to be rearranged to improve the utilization of system resources. For example, the identification of a null page allows subsequent processing operations to be moved forward while subsequent sleep periods are extended.

Subsequent processing operations, such as neighbor cell measurements are often scheduled to follow each burst. The gathering and evaluating of neighbor cell measurements help determine when to conduct a hand off or change which base station is serving the wireless terminal. During neighbor cell measurements, the wireless terminal measures the strength of neighboring cells, and then these measurements could be reported to the servicing base station (Mobile Assisted Hand Off "MAHO"). The network may then initiate handoff of the wireless terminal to a new servicing base station.

Rescheduling processing operations, such as these, may move forward process operations that are currently scheduled to follow a subsequent page. In this way, the awake period associated with a subsequent null page may be reduced. Future staggered processing operations may be consolidated and performed as a group following a null page. This consolidation allows the wireless terminal to enter a longer sleep mode period, or to more quickly enter a sleep mode period following the receipt of a subsequent page. Thus, moving forward the processing operations may allow the length of a subsequent awake period to be reduced In one specific embodiment, if after receiving the 1st paging burst and performing the null pattern match the result is inconclusive then the 2nd paging burst can be received and tested for conformity to the null paging message, and so on until all 4 bursts have been received. As one can appreciate, each paging burst which does not have to be received over the air-interface provides measurable and useful power consumption benefits.

When all 4 paging bursts of the block are received and decoded, this constitutes normal paging message reception/decoding. The benefits result from reducing the time that the radio (RF) portion of the receiver is employed (receiving 1 or 2 bursts instead of 4 bursts) and bypassing a large amount of unnecessary baseband message decoding and further processing to understand the contents of the message. Timeline 402 shows that the wireless terminal's processors are either awake or asleep. When the wireless terminal awakens it may fully decode the paging burst and conduct other processing operations. Operations such as neighbor cell measurements often are scheduled in a staggered fashion to follow receipt of each paging burst. However, when a paging burst or series of paging bursts is determined to be a null page, these operations may be rescheduled to immediately follow the current paging bursts processing. A favorable pattern comparison between the paging burst and a null page pattern may be used by the wireless terminal to determine that the paging burst is a null page. However, one should note that a null page might be required to be fully decoded. Time segments 404 and 406 show that the time required to fully decode the paging burst is much greater than that required to merely perform a pattern comparison on the processed paging burst with an existing null page pattern. One can appreciate that the wireless terminal will remain awake much longer when a full decode of the paging burst is required. This means that additional power will be consumed and processing resources will be utilized to fully decode the paging burst when compared to merely conducting a pattern comparison as indicated in block 406.

Figure 5:
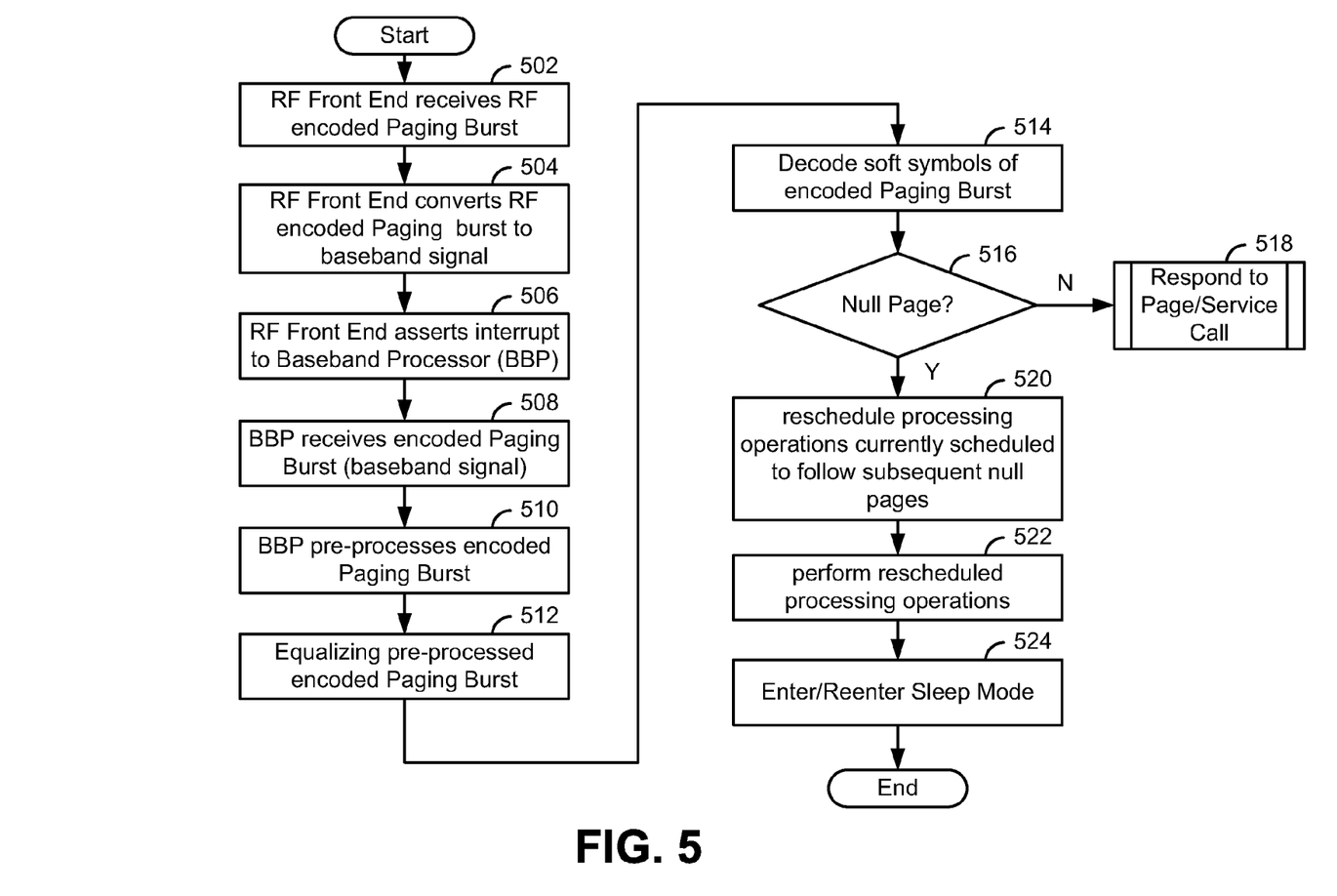
FIG. 5 is a flow chart illustrating operation of a wireless terminal in receiving and processing a paging burst and the rescheduling of processing operations according to the present invention.

FIG. 5 is a flow chart illustrating operation of a wireless terminal in receiving and processing a paging burst according to the present invention. The RF front end receives an encoded paging burst in step 502. The RF front end then converts the encoded paging burst into a baseband signal for the baseband processor in step 504. In step 506, the RF front end then asserts an interrupt to the baseband processor that causes the baseband processor to receive and begin processing the baseband signal containing the paging burst at step 508. The baseband processor pre-processes the encoded paging bursts in Step 510 and equalizes the pre-processed encoded paging bursts in Step 512 to produce soft decisions. Alternately, the equalizer module 318 equalizes the pre-processed encoded paging burst and interrupts the baseband processor to indicate that the equalizer operations are complete for the paging burst. In this case, the baseband processor receives the soft decisions from the equalizer module.

At Step 514 soft symbols of the encoded paging bursts are decoded. This decoding may be performed by the baseband processor 304 or the Encoder/Decoder module 320. The decoding of step 514 corresponds to the coding operations performed by the servicing base station in creating the paging burst. The decoded paging burst is evaluated at decision point 516 to whether or not the page is a null page. If the paging burst is not a null page, in Step 518 the wireless terminal responds to the page, which may include servicing a call.

If the page is a null page, processing operations currently scheduled to follow a subsequent null page may be rescheduled in Step 520 for immediate processing in Step 522. One method for identifying the null page is to compare the null page to a null page pattern created from processed associated with a prior null page. One technique for doing this processing involves concatenating the soft decisions into hard decisions and using the hard decisions as the null page pattern. Still another technique for determining the null page pattern is to re-encode the decoded null page to produce the null page pattern. Using this technique, the encoding scheme(s) that is used by the base station to encode paging bursts must be known and used. The wireless terminal may then re-enter the sleep mode for a predetermined period of time step 524.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In some embodiments, aspects of the present invention provide a system and method to manage the processing operations within a wireless terminal following the receipt of a paging burst, such as a null page, from a servicing base station that substantially meets the above-described needs as well as others. This involves first receiving an encoded paging burst on a paging channel. The encoded paging burst is decoded to produce a decoded paging burst. Then a determination is made to determine whether or not the decoded paging burst contains a null page for the wireless terminal. When the decoded paging burst contains a null page for the wireless terminal, processing operations within the wireless terminal may be rescheduled. Following the rescheduling of processing operations and the completion of any necessary processing operations, the wireless terminal may then enter a sleep mode for a brief period of time until the next scheduled paging burst is to be received. These processing operations may include, for example, the gathering and evaluating of neighbor cell measurements which are used to help determine when to conduct a hand off or change which base station is serving the wireless terminal.

Rescheduling of the processing operations may involve moving forward the processing operations that are currently scheduled to follow a subsequent page. In this way, future staggered processing operations may be consolidated and performed as a group following a null page. This consolidation allows the wireless terminal to enter a longer sleep mode period, or to more quickly enter a sleep mode period following the receipt of a subsequent page. Thus, rescheduling processing operations may allow the length of a subsequent awake period to be reduced.

Another embodiment provides a wireless terminal that has a radio frequency (RF) front end, a baseband processor communicatively coupled to the RF front end, and an encoder/decoder (CODEC) processing module communicatively coupled to the baseband processor. The combination of the RF front end, baseband processor, and processing CODEC processing module are operable to receive an encoded paging burst. Then, the combination may decode the paging burst and determine whether or not the decoded paging burst contains a null page for the receiving wireless terminal. When a null page is present, processing operations may be rescheduled to more efficiently utilize the resources and conserve power within the wireless terminal. When processing operations are complete, the wireless terminal may enter a sleep mode until the next scheduled paging burst is to be received. As in the previous embodiment, the processing operations may include the gathering and evaluation of neighbor cell measurements which may be used by the network to determine when a handoff of the servicing base station should take place. During neighbor cell measurements, the wireless terminal measures the strength of neighboring cells, and then these measurements could be reported to the servicing base station (Mobile Assisted Handoffs "MAHO"). The network may then initiate handoff of the wireless terminal to a new servicing base station. Rescheduling processing operations, such as these, may move forward process operations currently scheduled to follow a subsequent page. In this way, the awake period associated with a subsequent null page may be reduced.

Yet another embodiment provides a wireless terminal having an RF front end, a baseband processor, and a CODEC processing module. This combination receives the encoded paging burst and decodes the paging burst to produce a decoded paging burst. The combination also determines whether or not the decoded paging burst contains a null page for the wireless terminal. When the decoded paging burst contains a null page, the combination reschedules neighbor cell measurements currently scheduled to follow a subsequent paging burst to immediately follow the processing of the immediate paging burst containing a null page for the wireless terminal. The combination further directs that the wireless terminal enter a sleep mode at the completion of the processing operations following a null page. When the paging burst may include an extended page received in multiple parts separated by at least one frame, the processing operations may be rescheduled to be performed in between receipt of various portions of the extended page.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus, comprising:
an input that is operative to receive an encoded paging burst from a communication channel;
a decoder that is operative to decode the encoded paging burst thereby generating a decoded paging burst;
a baseband processor that is operative to analyze the decoded paging burst to determine if the decoded paging burst is a null page, wherein:
when the decoded paging burst is determined to be a null page, the baseband processor directs the apparatus to consolidate a plurality of staggered processing operations associated with the apparatus receiving a plurality of subsequent encoded paging bursts; and
the baseband processor directs the apparatus to perform the consolidated plurality of staggered processing operations during an awake period following the null page; and wherein:
upon completion of the consolidated plurality of staggered processing operations, the apparatus enters a sleep mode period that is shorter than a subsequent sleep mode period as a result of the consolidation of the plurality of staggered processing operations; and
the consolidation of the plurality of staggered processing operations makes a length of a subsequent awake period to be shorter than a length of the awake period.

2. The apparatus of claim 1, wherein:
the baseband processor is operative to analyze a plurality of decoded paging bursts, that includes the decoded paging burst, to determine if at least one of the plurality of decoded paging bursts is a null page; and
when at least one of the plurality of decoded paging bursts is determined to be a null page, the baseband processor directs the apparatus to consolidate a plurality of staggered processing operations associated with the apparatus receiving a plurality of subsequent encoded paging bursts and to perform the consolidated plurality of staggered processing operations immediately following the at least one of the plurality of decoded paging bursts that is determined to be a null page.

3. The apparatus of claim 1, wherein:
the decoded paging burst is a first decoded paging burst generated from a plurality of paging bursts; and
the decoder is operative to perform a partial decoding of a plurality of paging bursts, that involves decoding only a first paging burst of the plurality of paging bursts, to determine if the first decoded paging burst is a null page.

4. The apparatus of claim 1, wherein:
the baseband processor is operative to compare the decoded paging burst with a null page pattern to determine if the decoded paging burst is a null page.

5. The apparatus of claim 1, wherein:
the plurality of staggered processing operations associated with the apparatus receiving a plurality of subsequent encoded paging bursts includes gathering and evaluating neighbor cell measurements.

6. The apparatus of claim 1, wherein:
the apparatus is a wireless terminal.

7. An apparatus, comprising:
a baseband processor that is operative to analyze a decoded paging burst to determine if the decoded paging burst is a null page, wherein:
when the decoded paging burst is determined to be a null page, the baseband processor directs the apparatus to consolidate a plurality of staggered processing operations associated with the apparatus receiving a plurality of subsequent encoded paging bursts; and
the baseband processor directs the apparatus to perform the consolidated plurality of staggered processing operations during an awake period following the null page; and wherein:
upon completion of the consolidated plurality of staggered processing operations, the apparatus enters a sleep mode period that is shorter than a subsequent sleep mode period as a result of the consolidation of the plurality of staggered processing operations.

8. The apparatus of claim 7, wherein:
the baseband processor is operative to analyze a plurality of decoded paging bursts, that includes the decoded paging burst, to determine if at least one of the plurality of decoded paging bursts is a null page; and
when at least one of the plurality of decoded paging bursts is determined to be a null page, the baseband processor directs the apparatus to consolidate a plurality of staggered processing operations associated with the apparatus receiving a plurality of subsequent encoded paging bursts and to perform the consolidated plurality of staggered processing operations immediately following the at least one of the plurality of decoded paging bursts that is determined to be a null page.

9. The apparatus of claim 7, further comprising:
an input that is operative to receive an encoded paging burst from a communication channel; and
a decoder that is operative to decode the encoded paging burst thereby generating the decoded paging burst.

10. The apparatus of claim 7, wherein:
the consolidation of the plurality of staggered processing operations makes a length of a subsequent awake period to be shorter than a length of the awake period.

11. The apparatus of claim 7, wherein:
the decoded paging burst is a first decoded paging burst generated from a plurality of paging bursts; and
the decoder is operative to perform a partial decoding of a plurality of paging bursts, that involves decoding only a first paging burst of the plurality of paging bursts, to determine if the first decoded paging burst is a null page.

12. The apparatus of claim 7, further comprising:
the baseband processor is operative to compare the decoded paging burst with a null page pattern to determine if the decoded paging burst is a null page.

13. The apparatus of claim 7, wherein:

the plurality of staggered processing operations associated with the apparatus receiving a plurality of subsequent encoded paging bursts includes gathering and evaluating neighbor cell measurements.

14. A method performed within a communication device, comprising:

employing a baseband processor to analyze a decoded paging burst to determine if the decoded paging burst is a null page;

when the decoded paging burst is determined to be a null page:

consolidating a plurality of staggered processing operations associated with the communication device receiving a plurality of subsequent encoded paging bursts; and performing the consolidated plurality of staggered processing operations during an awake period following the null page; and upon completion of the consolidated plurality of staggered processing operations, entering the communication device into a sleep mode period that is shorter than a subsequent sleep mode period as a result of the consolidation of the plurality of staggered processing operations.

15. The method of claim 14, further comprising:

employing the baseband processor to analyze a plurality of decoded paging bursts, that includes the decoded paging burst, to determine if at least one of the plurality of decoded paging bursts is a null page; and when at least one of the plurality of decoded paging bursts is determined to be a null page, consolidating a plurality of staggered processing operations associated with the communication device receiving a plurality of subsequent encoded paging bursts and to perform the consolidated plurality of staggered processing operations immediately following the at least one of the plurality of decoded paging bursts that is determined to be a null page.

16. The method of claim 14, further comprising:

receiving an encoded paging burst from a communication channel; and decoding the encoded paging burst thereby generating the decoded paging burst.

17. The method of claim 14, wherein:

the consolidation of the plurality of staggered processing operations makes a length of a subsequent awake period to be shorter than a length of the awake period.

18. The method of claim 14, wherein:

the decoded paging burst is a first decoded paging burst generated from a plurality of paging bursts; and further comprising:

performing a partial decoding of a plurality of paging bursts, that involves decoding only a first paging burst of the plurality of paging bursts, to determine if the first decoded paging burst is a null page.

19. The method of claim 14, further comprising:

the baseband processor is operative to compare the decoded paging burst with a null page pattern to determine if the decoded paging burst is a null page.

20. The method of claim 14, wherein:

the plurality of staggered processing operations associated with the communication device receiving a plurality of subsequent encoded paging bursts includes gathering and evaluating neighbor cell measurements.

* * * * *

UNITED STATES PATENT AND TRADEMARK OFFICE
CERTIFICATE OF CORRECTION

| | | |
|---|---|---|
| PATENT NO. | : 7,953,385 B2 | Page 1 of 1 |
| APPLICATION NO. | : 12/631919 | |
| DATED | : May 31, 2011 | |
| INVENTOR(S) | : Sollenberger et al. | |

It is certified that error appears in the above-identified patent and that said Letters Patent is hereby corrected as shown below:

Title Page, Section (*) insert --This patent is subject to a terminal disclaimer.--

Signed and Sealed this
Thirtieth Day of October, 2012

David J. Kappos
*Director of the United States Patent and Trademark Office*